(12) United States Patent
Paige, Sr.

(10) Patent No.: US 10,798,882 B2
(45) Date of Patent: Oct. 13, 2020

(54) TREE AND SHRUB PROTECTOR RESERVOIR

(71) Applicant: Randall Lee Paige, Sr., Bennett, CO (US)

(72) Inventor: Randall Lee Paige, Sr., Bennett, CO (US)

( * ) Notice: Subject to any disclaimer, the term of this patent is extended or adjusted under 35 U.S.C. 154(b) by 420 days.

(21) Appl. No.: 15/400,857

(22) Filed: Jan. 6, 2017

(65) Prior Publication Data
US 2017/0188525 A1    Jul. 6, 2017

Related U.S. Application Data

(60) Provisional application No. 62/275,352, filed on Jan. 6, 2016.

(51) Int. Cl.
| | |
|---|---|
| *A01G 13/02* | (2006.01) |
| *A01G 13/10* | (2006.01) |
| *A01G 9/12* | (2006.01) |
| *A01G 29/00* | (2006.01) |

(52) U.S. Cl.
CPC .......... *A01G 13/0243* (2013.01); *A01G 9/12* (2013.01); *A01G 9/128* (2013.01); *A01G 13/0237* (2013.01); *A01G 13/10* (2013.01); *A01G 29/00* (2013.01)

(58) Field of Classification Search
CPC ........ A01G 9/12; A01G 25/02; A01G 25/023; A01G 27/02; A01G 25/06; A01G 29/00; A01G 13/0237
USPC ......................................................... 47/48.5
See application file for complete search history.

(56) References Cited

U.S. PATENT DOCUMENTS

| | | | | |
|---|---|---|---|---|
| 2,105,800 A | * | 1/1938 | Watkins ................. | A01G 29/00 405/44 |
| 3,109,258 A | * | 11/1963 | Jensen ................... | A01G 29/00 47/48.5 |
| 3,324,591 A | * | 6/1967 | Bergstein ................ | A01C 5/02 47/78 |
| 3,425,630 A | * | 2/1969 | Fessler, Sr. ........... | A01G 25/00 137/356 |

(Continued)

FOREIGN PATENT DOCUMENTS

DE         3701057 A1 *  8/1987   ......... A01G 13/0237

*Primary Examiner* — Christopher D Hutchens
(74) *Attorney, Agent, or Firm* — Shaver & Swanson, LLP; Scott D. Swanson

(57) ABSTRACT

A tree/shrub protector includes a circular underground drip reservoir that may hold about seven gallons of water and extended about eighteen inches underground. It focuses water and nutrients onto a root ball to encourage downward root growth. Above ground modules include a hard shell reservoir that provides pest protection as well. Another above ground module is a wire type protective fence and/or trellis that has reservoirs as well. A second embodiment has a grill or fence having spikes driven into the ground for support. One or more water reservoirs are integrated into the fence. Variable flow drip tubes feed underground drip pipes from the reservoirs. Vertical poles have uses including tree support, holding a winter shroud, and supporting a fence and/or trellis. The fence is modular to fit inside a thin box. An optional anti-rodent spiked ring is included. All embodiments can reduce returns to a tree vendor.

10 Claims, 10 Drawing Sheets

(56) References Cited

U.S. PATENT DOCUMENTS

| | | | | |
|---|---|---|---|---|
| 3,711,992 | A * | 1/1973 | Martin | A01G 29/00 |
| | | | | 47/48.5 |
| 3,865,309 | A * | 2/1975 | Greenhalgh | B05B 1/20 |
| | | | | 239/268 |
| 3,933,311 | A * | 1/1976 | Lemelson | B05B 1/18 |
| | | | | 239/276 |
| 4,067,143 | A * | 1/1978 | Alwell | A01G 27/06 |
| | | | | 47/79 |
| 4,665,645 | A * | 5/1987 | Schau, III | A01G 13/0237 |
| | | | | 47/32.7 |
| 4,843,757 | A * | 7/1989 | O'Hara, Jr. | A01G 25/06 |
| | | | | 47/48.5 |
| 4,869,018 | A * | 9/1989 | Scales | A01G 27/02 |
| | | | | 47/33 |
| 4,961,285 | A * | 10/1990 | Jenkins | A01G 27/003 |
| | | | | 47/79 |
| 5,272,835 | A * | 12/1993 | Stern | A01G 27/02 |
| | | | | 47/79 |
| 5,357,710 | A * | 10/1994 | Dulik | A01G 17/06 |
| | | | | 47/48.5 |
| 5,755,383 | A * | 5/1998 | Joseph | A01G 9/28 |
| | | | | 239/276 |
| 6,418,663 | B1 * | 7/2002 | Smith | A01G 27/006 |
| | | | | 47/48.5 |
| 8,857,103 | B1 * | 10/2014 | Coon | A01G 9/124 |
| | | | | 47/45 |
| 9,060,472 | B2 * | 6/2015 | Li | A01G 27/06 |
| 2003/0140557 | A1 * | 7/2003 | Lyon | A01G 27/02 |
| | | | | 47/79 |
| 2015/0319944 | A1 * | 11/2015 | MacKichan | A01G 29/00 |
| | | | | 47/45 |
| 2016/0066518 | A1 * | 3/2016 | Kaminski | A01G 25/16 |
| | | | | 239/1 |

* cited by examiner

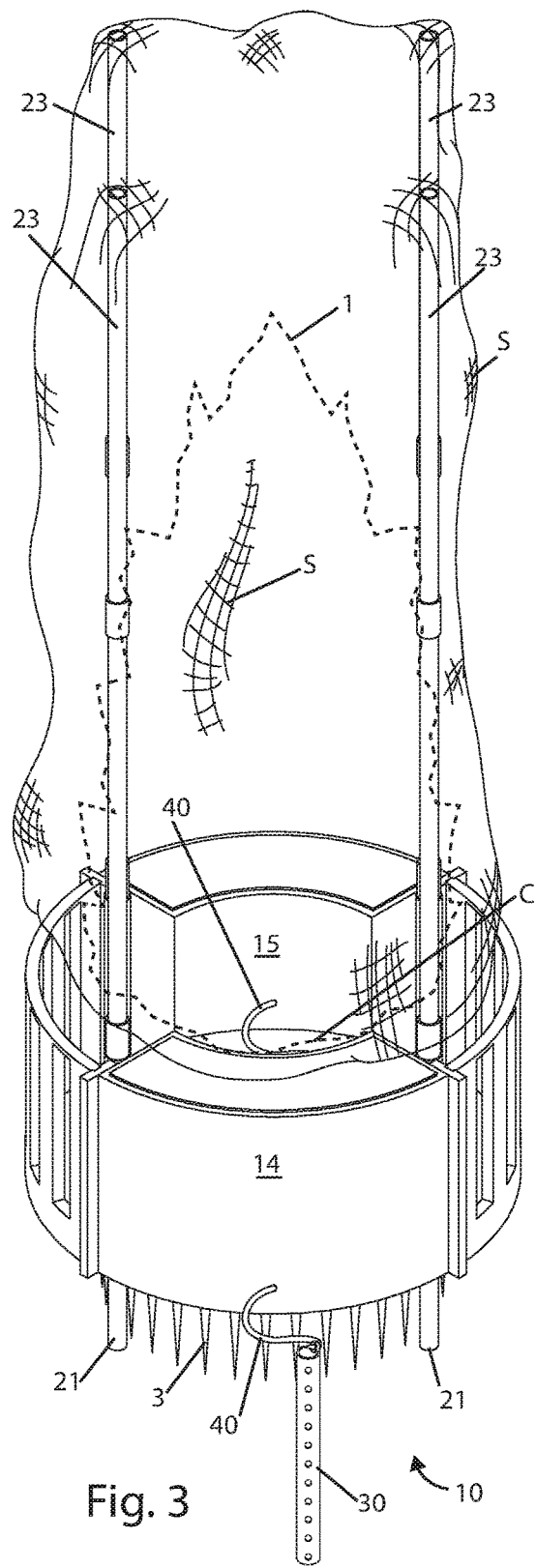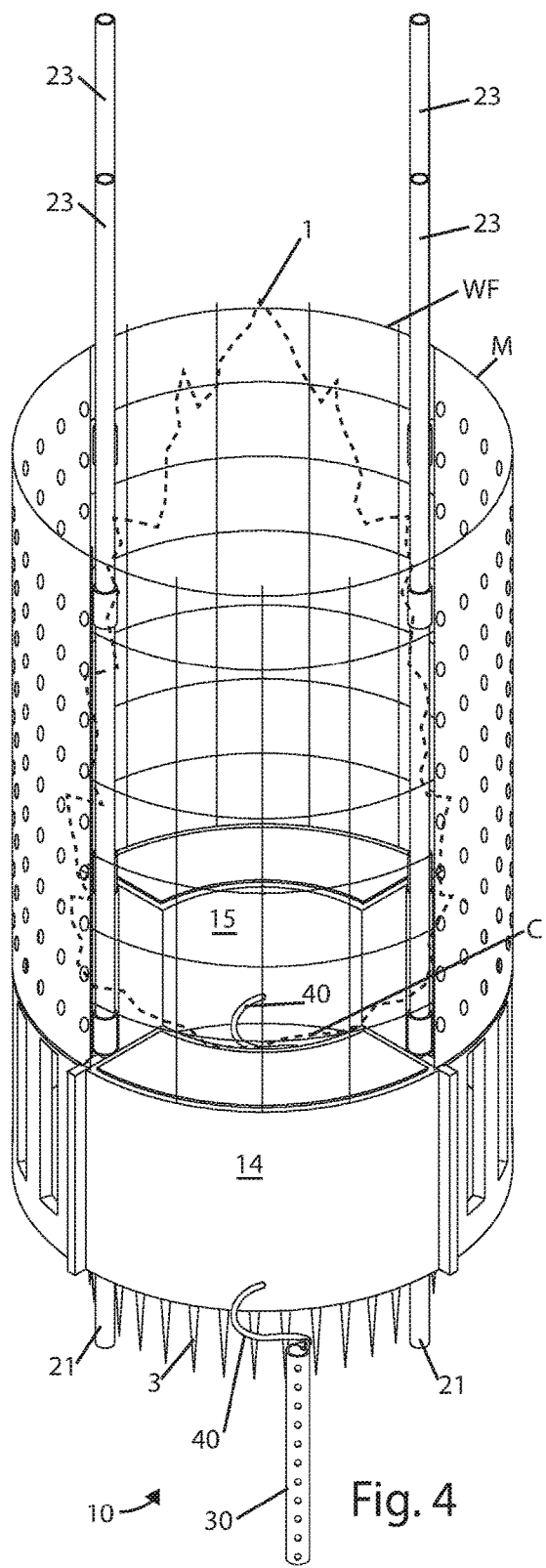

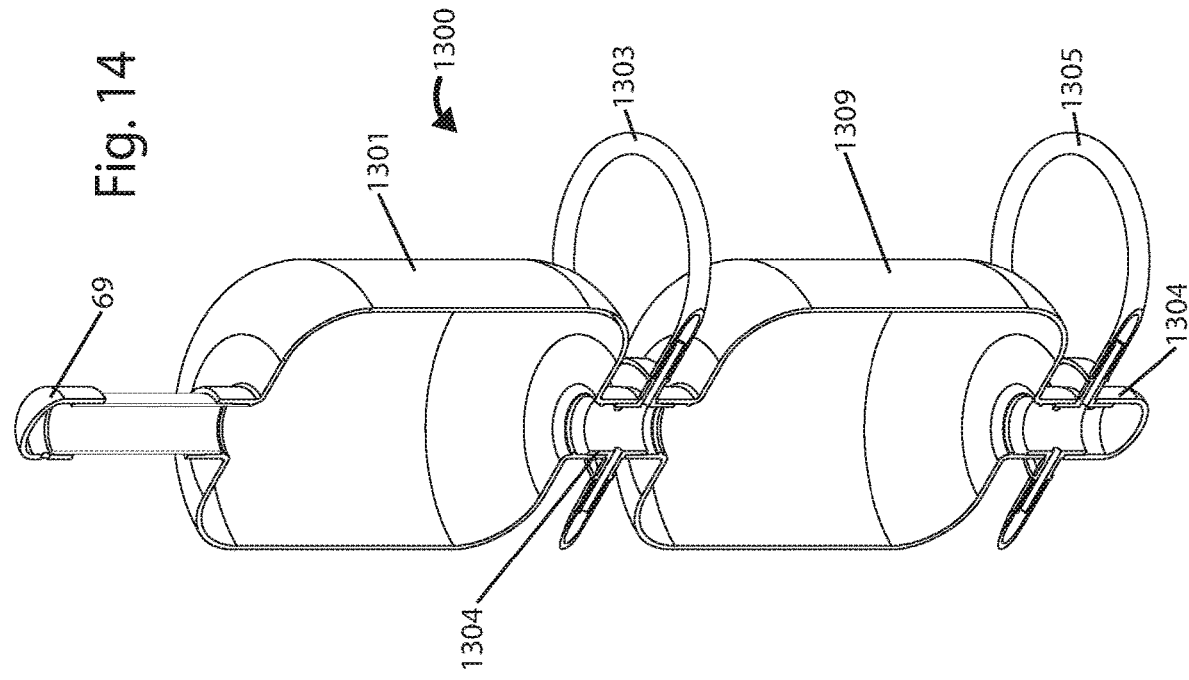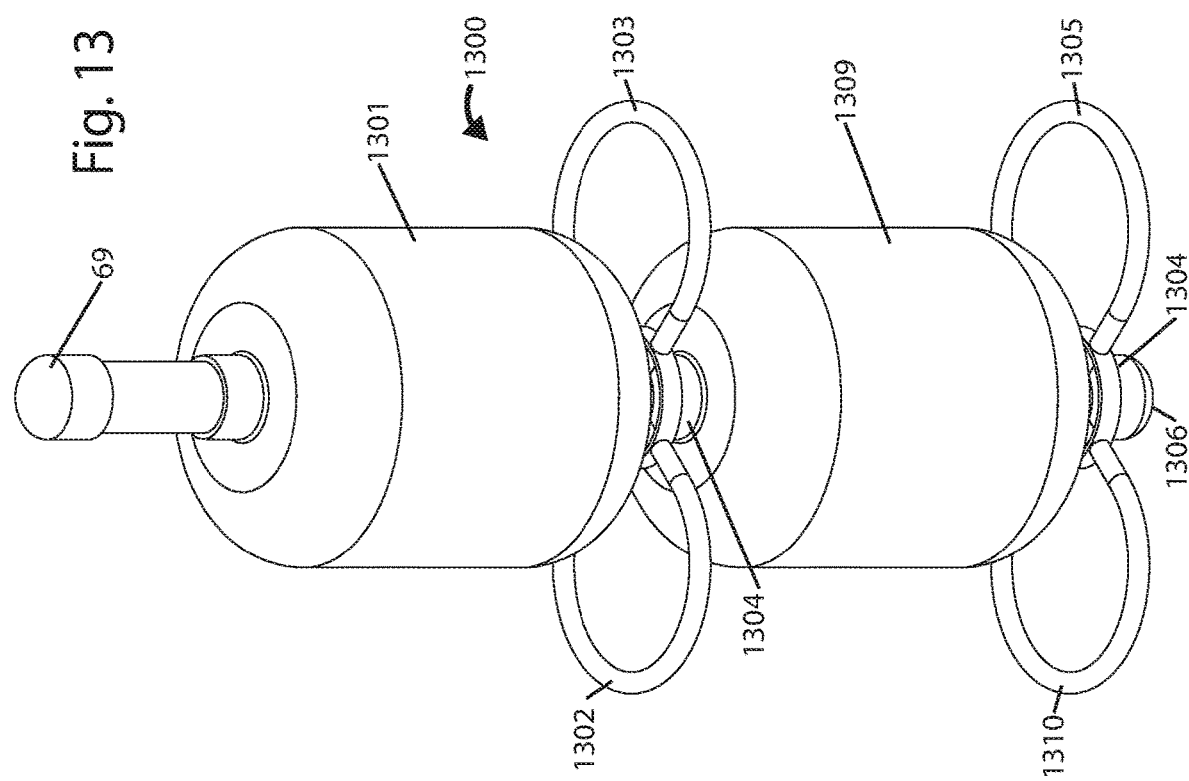

TREE AND SHRUB PROTECTOR RESERVOIR

CROSS REFERENCED APPLICATIONS

This non-provisional application claims priority from provisional application No. 62/275,352 filed Jan. 6, 2016 which is incorporated by reference herein in its entirety.

FIELD OF INVENTION

The present invention relates to a modular above and below ground protective pest barrier and combination reservoir apparatus that provides underground drip irrigation for extended periods of time.

BACKGROUND OF THE INVENTION

Newly planted trees and shrubs need water and protection from rabbits and the like. Today a significant percent of new trees and shrubs are returned under a warranty program. This return of dead trees and shrubs is often caused by the owner's failure to water and/or protect against rabbits, rodents and the like.

A brief summary of known prior art attempts to protect a newly planted tree or shrub follows below.
1. U.S. Pat. No. 799,466 to Holt & Peacock for a "Tree Protector" describes a cylindrical device made of wire with ribs that surround the trunk and extend to the ground.
2. U.S. Pat. No. 2,782,561 to Smith for a "Tree Surrounding Ring" describes a three dimensional ring built in sections to surround a tree trunk. It is fitted together via interlocking pieces and fitted to the ground with stakes.
3. U.S. Pat. No. 3,305,969 to Mattson describes a tree or plant protector collar that is a flat collar that lies on the ground around the base of a tree or plant.
4. U.S. Pat. No. 4,642,938 to Georges et al. describes a plant protection system that includes a cone shaped housing positioned in a ring around a tree trunk. A heat source is a water pipe or spray emitter located within the housing. The water source is a well or pipe or house from outside the housing.
5. U.S. Pat. No. 4,648,203 to Worzek describes a tree protector for surrounding a tree trunk base including a base, a barrier wall, and a slit, crescent shaped flaps, hinged together and spikes that anchor it into the ground. The central base allows for capture and permeation of liquids held in the reservoir defined by the barrier wall.
6. U.S. Pat. No. 4,955,156 to Williams describes a plant watering and root protection device that is conical in shape and mostly submerged under the soil line to protect the roots from rodents. Part of the conical shaped device protrudes above the surface and serves to capture water from flowing away from the tree base.
7. U.S. Pat. No. 5,575,109 to Kuntz describes a plant protection device that includes a root protection barrier which may be heated and may include an inner shell and an outer shell, a cylindrical chamber connected to the root protection barrier which may be heated and formed from a plurality of interlocking segments, and a top dome which can be connected to the cylindrical chamber to protect the plants from elements.
8. U.S. Pat. No. 5,615,517 to Smith describes an apparatus and method for irrigation plants that includes an open-ended, water-retaining, root barrier envelope which is placed around the root system, and a plurality of root deflector ribs for delivering water, aeration and fertilizatier that extend downward along the envelope.
9. U.S. Pat. Application Publication No. 20060096172 A1 to Powell describes a C-shaped tree and plant watering pail which can be fitted around the stem or trunk of a tree or plant and holds water which is slowly released into the soil through porous bottom section. The apparatus has a removable flexible cover.

The two closest references include:
10. U.S. Pat. No. 4,341,039 to Reese discloses an insulating device for trunks of trees or plants. The device fits around the trunk and is a collar made of two segments and includes an internal compartment for holding a liquid.
11. CN 203492504 U discloses a tree water planting device formed by claw hooks, a plastic cover, reinforced concrete ribs, and a nutrient solution box. The claw hooks extend out from the reinforced concrete columns and connect to stakes in the ground via a grappling hook. The nutrient solution box has a transfusion pipe.

What is needed in the art is a modular combination pest barrier and reservoir assembly for a newly planted tree or shrub that can drip irrigate the vegetation for weeks on end, protect against animals both above and below ground, support a winter shroud and serve as an upright support for the trunk of the growing tree or shrub. The present invention provides several embodiments including an underground reservoir(s), an above ground reservoir(s) with either a soft or a hard shell animal protector and various combinations thereof.

SUMMARY OF THE INVENTION

The present invention provides a modular circular fence with integral reservoirs that drip feed water and nutrients to the roots underground. Vertical posts can support further fencing, a trellis, or a winter shroud. Ground spikes also support vertical posts that can be used to keep the trunk straight.

The main aspect of the present invention is to provide a subterranean drip reservoir (also called a subterranean plant root basket and reservoir) that encircles a newly planted root system of a tree or shrub and waters the roots deep underground.

Another aspect of the present invention is to provide a pest barrier around the reservoir.

Another aspect of the present invention is to provide a pest barrier on the base of the reservoir.

Another aspect of the present invention is to provide a choice of a hard shell above ground reservoir or a wire style soft shell above ground reservoir that mounts atop the subterranean drip reservoir.

Another aspect of the present invention is to provide support for either the hard or soft shell above ground reservoir to be used alone without the subterranean drip reservoir.

Another aspect of the present invention is to provide a different embodiment modular fence for installation around a newly planted tree, shrub or plant.

Another aspect of the present invention is to provide a quick assembly of the circular fence including spikes into the ground for a strong upright support.

Another aspect of the present invention is to provide an integral set of reservoirs attached to the fence.

Another aspect of the present invention is to provide a variable drip feed assembly from each reservoir to an underground irrigation pipe.

Another aspect of the present invention is to provide vertical posts supported by the fence and functioning to provide support for a winter shroud and/or a trellis and/or a wire fence and/or solid fence or baffle.

Another aspect of the present invention is to use the vertical posts as trunk support stanchions using tethers.

Another aspect of the present invention is to provide root protection from animals using spikes.

Another aspect of the following invention is to provide a multi-layer reservoir suitable to dig in next to a planted tree.

Other aspects of this invention will appear from the following description and appended claims, reference being made to the accompanying drawings forming a part of this specification wherein like reference characters designate corresponding parts in the several views.

Most plants receive water and nutrients from the surface. The water and nutrients then proceed in a downward percolation toward the roots and are then absorbed by the roots. Once absorption has occurred the roots reprocess the water and nutrients into useful form for use by the xylem. Once introduced into the xylem the upward transport of water and nutrients proceeds toward the leaves of the plant via turgidity.

If plants are not provided with needed water and nutrients the result can be slightly to severely stressed plants from the root system upward. In the conventional mode of absorption much of the water and nutrients are unable to penetrate to the levels where they are needed. A significant amount of water and nutrients never get to the root system in that they are prevented via evaporation. This can result in plants that are less than vibrant or in some cases unable to sustain themselves.

The advantage of the present invention is to provide a mode where water and nutrients can bypass air evaporation and go directly into the solidity of the soil, where they can then be absorbed directly. In this manner roots get the nourishment (in both water and nutrients) that they need at a greater volume as compared to surface watering. This provides for optimum performance in the plant roots and by extension to the entire plant. Fostered under such conditions the enhanced growth rate of the plant can be achieved in a safe and controlled manner.

Further, the system provides a mechanism to shield against the four primary agents of damage to trees, shrubs and even gardens (in the expanded mode). The four negative agents are storms, insects, animals, and drought. The system can be used to convert acidic soils into alkaline solid and vice versa, by the creation of a barrier to prevent converted soil from escaping as freely as it would otherwise be the case in open and uncontrolled area. Of course, the soil in and of itself would have to be converted via replacement or amendment.

This invention is designed to create an all-inclusive system in regards to encouraging healthy and sustainable development in plants and shrubs (and in the expanded mode, gardens). It provides for segregation and barrier protection of plants from harmful or competitive weeds. Though designed from the perspective of developing plants in the formative stages, the embodiments can also be used in regard to stabilizing mature plants that have become stressed and that are in danger of demise.

The first embodiment of the invention provides a (nominally three foot wide by eighteen inches deep) plastic drip reservoir that holds about seven gallons of water (plus optional nutrients). A hose can fill an above ground inlet in minutes. A circular fence and perforated bottom enclose a plurality of criss-crossed drip hoses with slow emitters at their distal ends. The water is focused to drain in a central area under the roots.

The second embodiment of the invention (FIGS. 1-4) is divided into four major parts with additional components that can be added or left out, depending on application needs.

The basic functioning of the system provides for a bottom to top strategy for enhancing and encouraging plant development.

Feature #1 (Optional)

The optional part of the subterranean staking ring. This part is the circular component that can be attached to the bottom of the invention to the reservoir and the grill. The subterranean staking ring is composed of mini spikes, ranging from about 6" or less in length to about 12" or more that protrude into the ground. The spikes may be about 1" in diameter and screw into the subterranean ring where they are setting apart by about 2" spacing around the circumference of the ring. This feature provides a barrier against burrowing animals.

Feature #2 (Essence of One Embodiment of the Invention Shown in FIG. 1)

The heart of the second embodiment of the invention is composed of the reservoirs, both left and right (attached to the circular fencing) which are connected to the grills, both front and rear. The parts may be connected via a ball and sleeve joint that runs the vertical length of the grill/reservoir parts forming a connected and enclosed system. With the forming of this system; a portable irrigation and containment device is created.

Connected to the reservoir system are two drip irrigation ports for both the left and right reservoirs. Through these drip irrigation ports liquid (water and/or water plus nutrients) can flow via connection tubing to the drip emitter.

A connection ball is then inserted in the hard vertical pipe where the irrigation process can occur. The process can occur on a continuous basis via weekly or bi-weekly replenishment (depending on drip settings). The process can also be intermittent where the reservoirs are allowed to run dry. This provide a brief period in which the roots of the plant are allowed to partially dry and consolidate.

Feature #3 (Optional, Depending on Deployment of Invention)

The method of attaching the invention to the ground may be achieved via four (4) staking connection points. These parts are connected to the left and right reservoirs in a vertical manner on the left and right outer edges of the reservoirs. They are located adjacent to the connection point for the reservoirs and the grills.

They are hard vertical tubes through which the staking pole can be inserted and driven into the ground to depth of 6" or more, this being achieved by use to the metal stake driver.

The staking poles are driven in at four points to provide for maximum adhesion to the ground. The ability to drive the stakes deeply into the ground is achieved by the use of a detachable metal hammer cap. The cap is screwed into the upper portion of the staking pole and through its use the staking pole is not damaged while it is hammered into place.

Feature #4 (Optional)

This method provides for upper staking of the invention. Once the invention is secured to the ground, the hammer caps can be removed and vertical extension staking poles can be attached to the lower staking poles.

The vertical extension poles can be attached in either a two poles or four poles manner. The attribute of this mode provides for upper staking and securement of the tree against forces of the wind and/or snow. Curtain mesh, provides for open screen coverage of the plants against forging animals and/or insects.

Feature #5 (Optional)

This method provides for in place cold framing and winterizing of the plant. By usage of upper baffles provision is made to secure and protect plant during winter months. In addition to winterization, baffles can be used in a variety of modes throughout the year to provide for hard mesh features, such as a wire guard (an extension concept of feature 4) or as sun and or wind blocks.

Additional Attributes

In addition to the above features, other enhancements can be provided to increase the overall efficiency of the invention. The use of ground mesh cover in addition to organic mulch material can create an air layer between the mulch and the ground that is conducive to a more rapid breakdown of the mulch material, in addition to providing for greater stability around the plant base.

The use of liquid nutrients through the drip tubing and solid nutrients applied at the surface can enhance the growth of the plant and contribute to maintaining health and vibrancy. Applied judiciously these two elements can be used to speed up the growth of the plant by maintaining concentrated fertigation.

Alternative Embodiments

Mode #1

The invention can also be used to enhance the overall appearance of a tree or shrub by providing for a collar like perimeter where flowers can be planted in the reservoirs. In this mode the perimeter is maintained in a 50/50 flower plant (reservoir) and grill mode.

This embodiment can be utilized after the tree or shrub has become established by leaving the invention in place, or it can be utilized from the beginning as an enhancement of the tree or shrub. The arrangement can be secured by the use of epoxy glue.

Mode #2

Another embodiment for the invention would be in the area of climbing and vining vegetables species (beans, tomatoes, etc.). In this embodiment the invention provides for containment of the plant while at the same time permitting and encouraging upward and outward expansion. This mode uses the upper baffles and fencing. The use of the reservoirs to provide water and/or nutrient could further enhance productivity of the plants.

Mode #3

The unit can be used strictly for containment of the plant without the use of reservoirs. This is achieved by using the front and rear grills in conjunction with the reservoir solid blank or a duplication of the front and rear grills.

One embodiment shown in FIG. 11 uses a subterranean plant root basket and reservoir comprising a plastic hose formed as a circle nominally three feet in diameter. Nominally eight vertical posts have a fluid connection to the circular hose. An inlet allows about eight gallons of water to remain in the container assembly, and drip hoses facing inward provide a slow drainage of the container assembly into the root ball. Alternately an emitter at the bottom of the vertical posts can provide the drainage. An above ground reservoir such as shown in FIGS. 8-10 can be used with this underground embodiment or separately.

BRIEF DESCRIPTION OF THE DRAWINGS

FIG. 3 is the same view as FIG. 1 with the addition of a soft shroud covering the tree.

FIG. 4 is the same view as FIG. 1 with the addition of an upper protective fencing supported by the vertical poles.

FIG. 13 is a top perspective view of a planted tree embodiment.

FIG. 14 is a longitudinal sectional view of the FIG. 14 embodiment.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
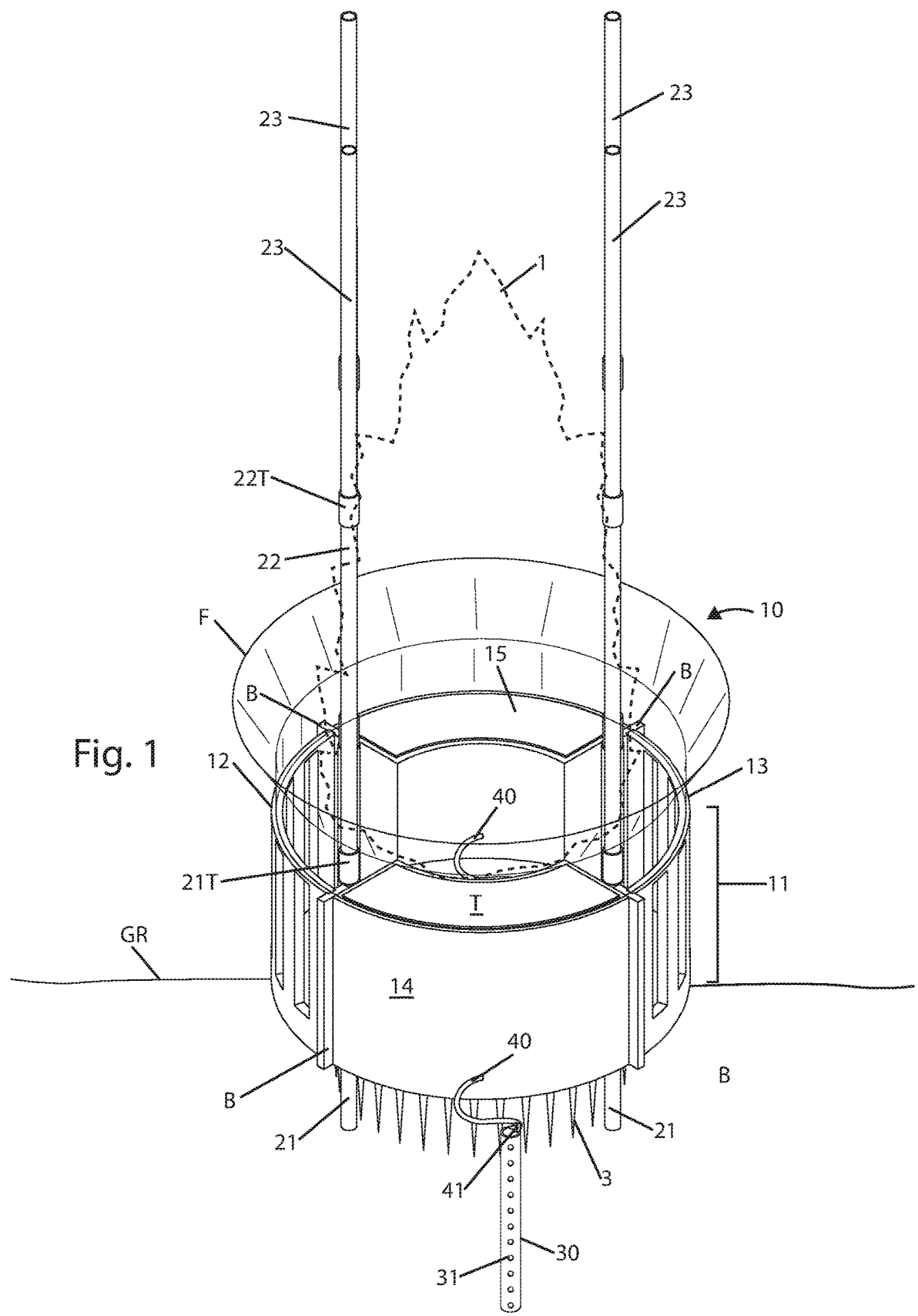
FIG. 1 is a top perspective view of the invention installed around a newly planted tree.
Figure 2:
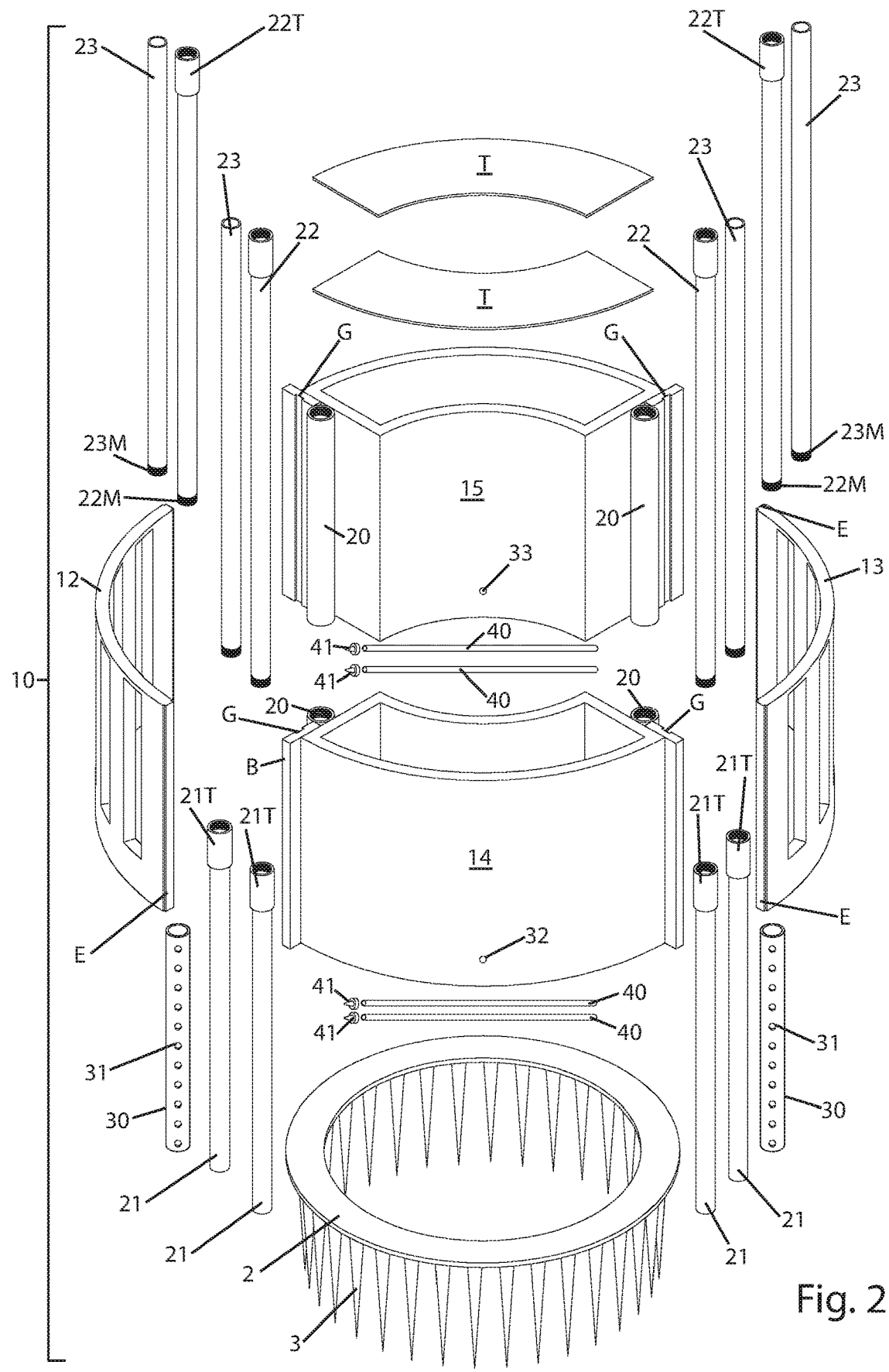
FIG. 2 is an exploded view of the invention shown in FIG. 1.

Referring first to FIGS. 1, 2 a newly planted tree 1 is shown in dots. The ground surface G is penetrated by a circular spiked ring 2 having spikes 3. A hammer can be used to drive the ring 2 into the ground GR. The spikes 3 keep rodents away from the roots.

The tree protector 10 comprises a modular (circular) fence 11. Fence sections 12 and 13 are identical. Reservoir fence sections 14 and 15 are identical. The tops T are removable for pouring water (and nutrients) into the reservoirs 14, 15. Braces B are attached to reservoirs 14, 15 at each end. Their grooves G receive the fence section ends E to assemble the tree protector 10.

Each reservoir section 14, 15 has two integral guides 20 which receive ground stakes 21. A hammer can be used to drive the ground stakes 21 into the ground surface GR. Each ground stake 21 has a threaded top 21T which can receive a male thread 22M of a post 22. The post 22 can have a female threaded top 22T which can receive a male thread 23M of upper post 23. Thus, four posts 22/23 can surround the central hole C of the tree protector 10. The upper posts 23 can be added as the tree grows.

Each reservoir can have an inner drain outlet 33 and an outer drain outlet 32. Each drain outlet can feed a tube 40. The distal end of each tube 40 can have a drip nozzle 41. These drip nozzles come in various flow rates, so the user can adjust the drip rates with various drip nozzles 41.

Each reservoir 14/15 can irrigate a below ground drip pipe 30 which has exit holes 31. Thus, direct watering of the roots is accomplished without water loss from evaporation from the ground surface GR.

An optional collar or flange F can be supported by the fence 11 so as to deter animals.

The entire tree protector can fit into a retail box (not shown) for convenient storage on a retail shelf.

Referring next to FIG. 3 the assembled tree protector shown in FIG. 1 has an additional shroud S supported by the four posts 22/23. This flexible shroud S could be for winter protection or insect protection. The shroud could be a flexible mesh such as a ½ inch square mesh, or a solid shroud with few to no holes spaced thereon.

Referring next to FIG. 4 the shroud S has been replaced with a wire fence WF to protect the tree 1 from deer or the like. Alternately a solid baffle or fence F could be used for added protection. This fence F may be interspersed with holes as shown in or be solid depending on need/want for air flow to the plant. This baffle could be constructed of plastic or any other appropriate material such as metal. Not shown could be a trellis through which a grape vine or the like could be grown. Not shown is a tether wrapped around the tree trunk to keep the tree 1 upright. The posts 22/23 can support the tether(s).

Figure 5:
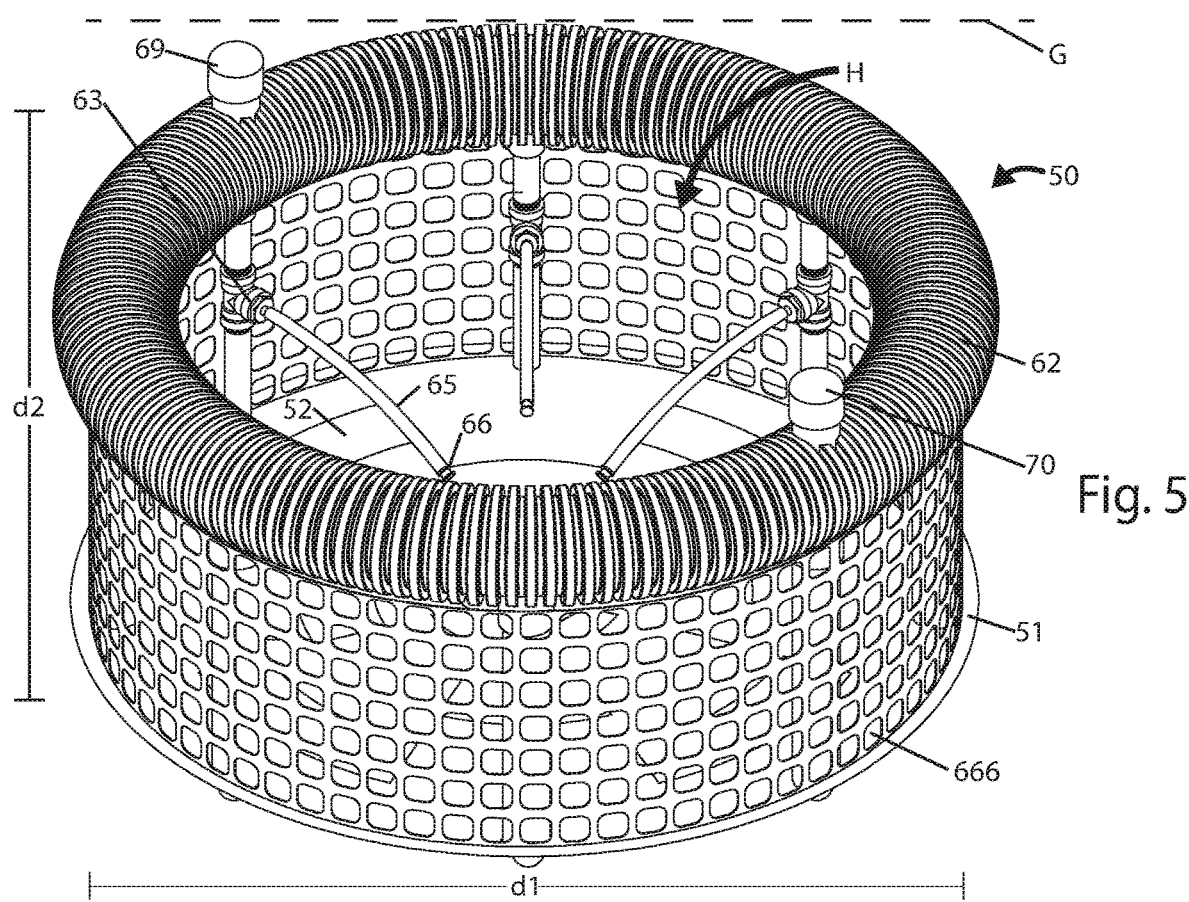
FIG. 5 is a top perspective view of an underground drip reservoir.
Figure 6:
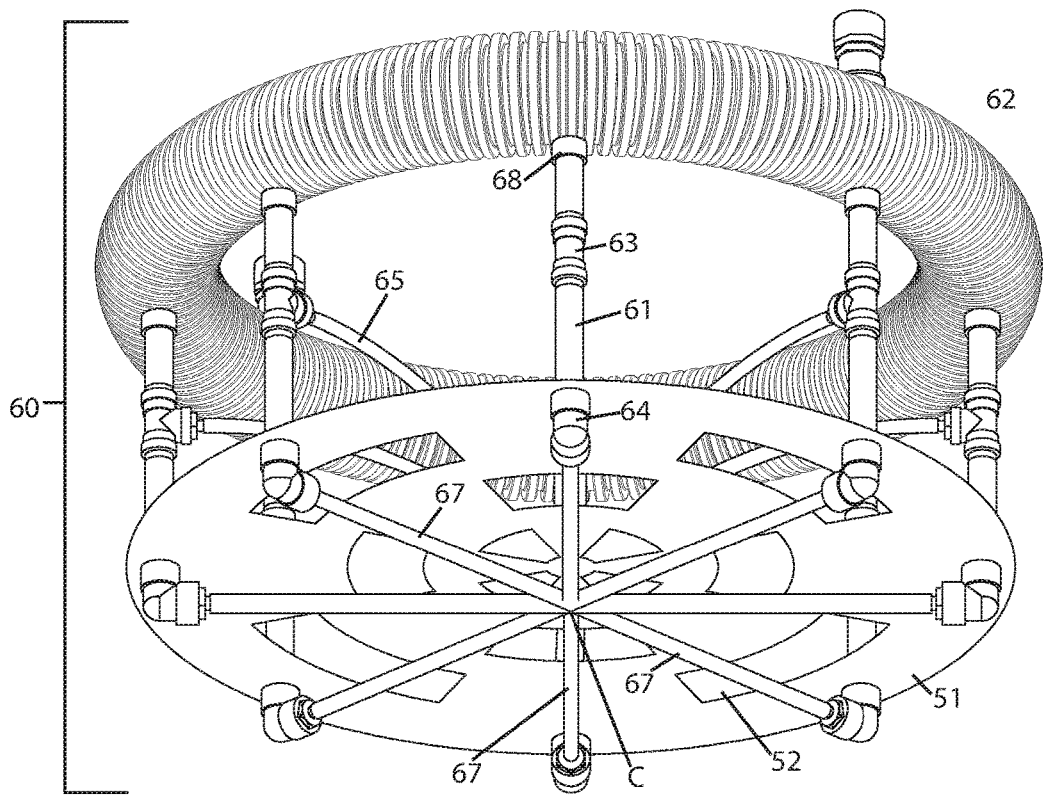
FIG. 6 is a bottom perspective view of the underground drip reservoir shown in FIG. 1.

Referring next to FIGS. 5,6 an underground drip reservoir 50 has a circular base 51 which has anti-rodent holes 52. These holes 52 allow roots to grow down through them, but are sized to prevent entry by pests such as rats, gophers, voles, and ground squirrels. The frame 60 of the underground drip reservoir 50 is made up of the base 51, vertical pipes 61, where the vertical pipes are not curved and have no apertures, (nominally eight of the shown) and a hose 62 serving as the top. A central hollow H receives the root ball of a tree or shrub. The top of the hose 62 should be at ground level G when the underground drip reservoir 50 is properly buried in a hole getting ready to plant a new tree or shrub. Nominal dimensions are d1=3 feet and d2=1.5 feet and the diameter of hose 62 is about four inches to about eight inches. Each vertical non-curved pipe 61 may have two soaker hose outlets labeled 63 for the center outlet and 64 for the bottom outlet. The center soaker hoses are labeled 65. Each soaker hose 65 has a slow emitter end cap 66. The emitter 66 extends to a few inches from the center C of the base 51. All soaker hoses are prior art perforated hoses preferably a half inch wide.

The embodiment 560 shown has eight bottom outlets 64, wherein opposing pairs are connected by a soaker hose 67. These soaker hoses emit water (and nutrients if desired) under the root ball which rests in hollow H. Thus, the roots are encouraged to grow down through holes 52.

In operation above ground inlets 69, 70 are used to fill about seven gallons (about 5 to about 10 gallons) of water into hose 62, vertical non-curved pipes 61 and soaker hoses 65, 67. It is estimated that a sandy soil will absorb the seven gallons in about two days, a loam soil in about four to eight days, and a clay soil in about eight to sixteen days. The hose 62 can be a prior art plastic hose, and watertight fittings 68 can be a plastic part sealed with glue.

Figure 7:
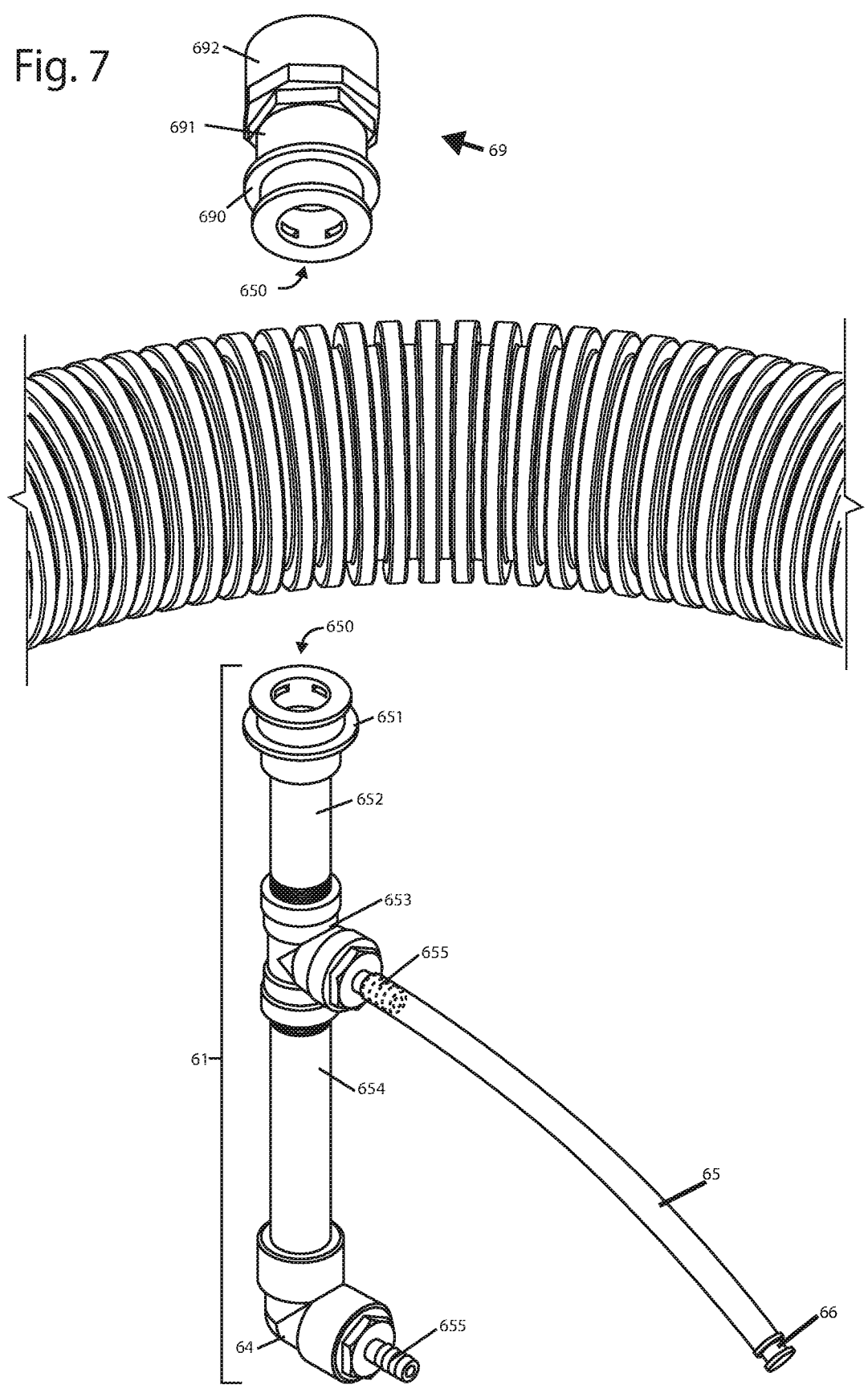
FIG. 7 is an exploded view of the vertical pipe components shown in FIG. 1.

Referring next to FIG. 7 the inlet 69 can be a custom plastic adapter 690 connected to a prior art PVC pipe 691 which is threaded into a prior art PVC cap 692.

A hole 650 is cut into a prior art hose 62 to accept a custom plastic adapter 651. A prior art PVC pipe 652 threads into a PVC tee adapter 653, which threads into a lower PVC pipe 654. A prior art PVC elbow can serve as the bottom outlet 64. Prior art straight-barb fittings 655 secure the soak hoses 65, 67. The rodent barrier 666 can be a flexible plastic fence segment.

Figure 8:
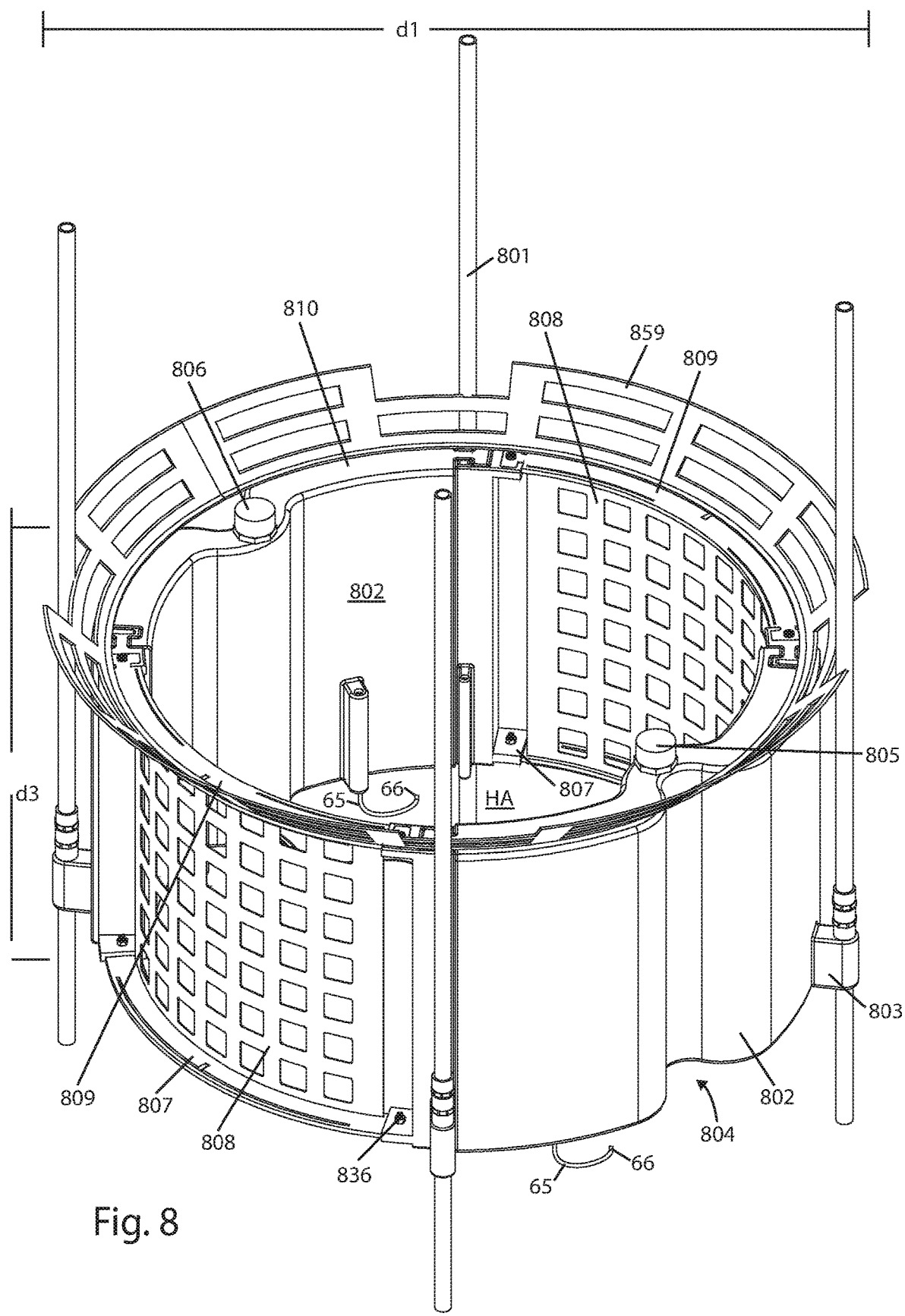
FIG. 8 is a top perspective view of an above ground hard shell reservoir that can be used alone or on top of the FIG. 1 embodiment.

Referring next to FIG. 8 a hard shell above ground reservoir 800 can be mounted above the underground drip reservoir by driving pegs 801 into the ground. Each vertical reservoir 802 has peg supports 803. The indents 804 provide access to inlet ports 69, 70.

Inlet ports 805,806 are used to fill the vertical reservoir 802 which may hold about 2 to about 5 gallons if d3=about 6 to about 9 inches. The vertical reservoirs 802 are identical which saves manufacturing and engineering costs.

The tops 810 of each vertical reservoir 802 attach to a top bracket 809 of each screen 808, and the bottom brackets 807 of the screens 808 attach to the bottoms of vertical reservoirs 802 with a fixture 836. A pest protector collar 859 encircles the top members 810,809 to help deter rodents and the like. The hollow HA is about the same diameter as hollow H of FIG. 5. Interior and exterior soak hoses 65 are possible. The pegs 801 can support various tree/shrub accessories as shown in FIGS. 1, 3, 4.

Figure 9:
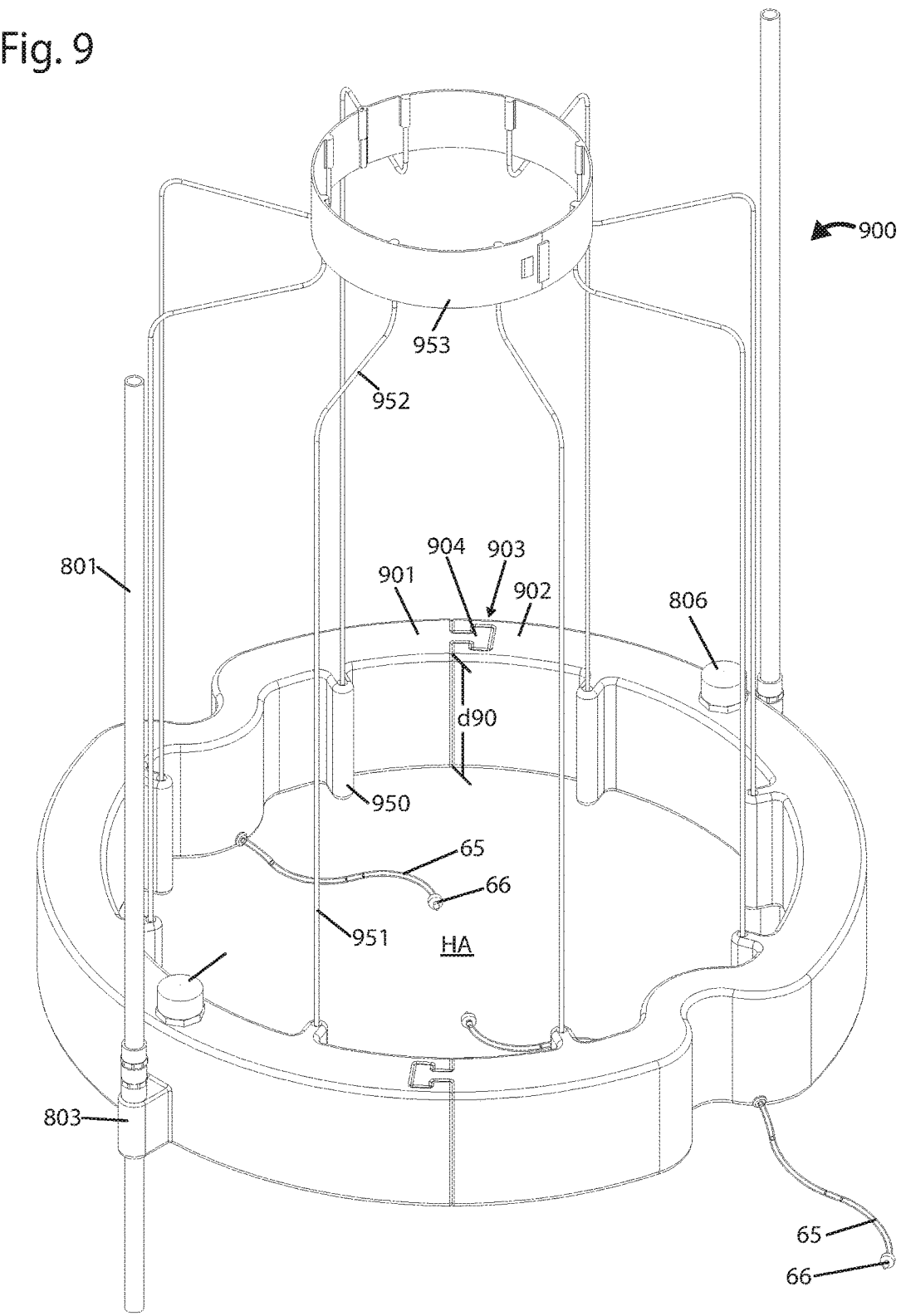
FIG. 9 is a top perspective view of an above ground soft shell reservoir that can be used alone or on top of the FIG. 1 embodiment.
Figure 10:
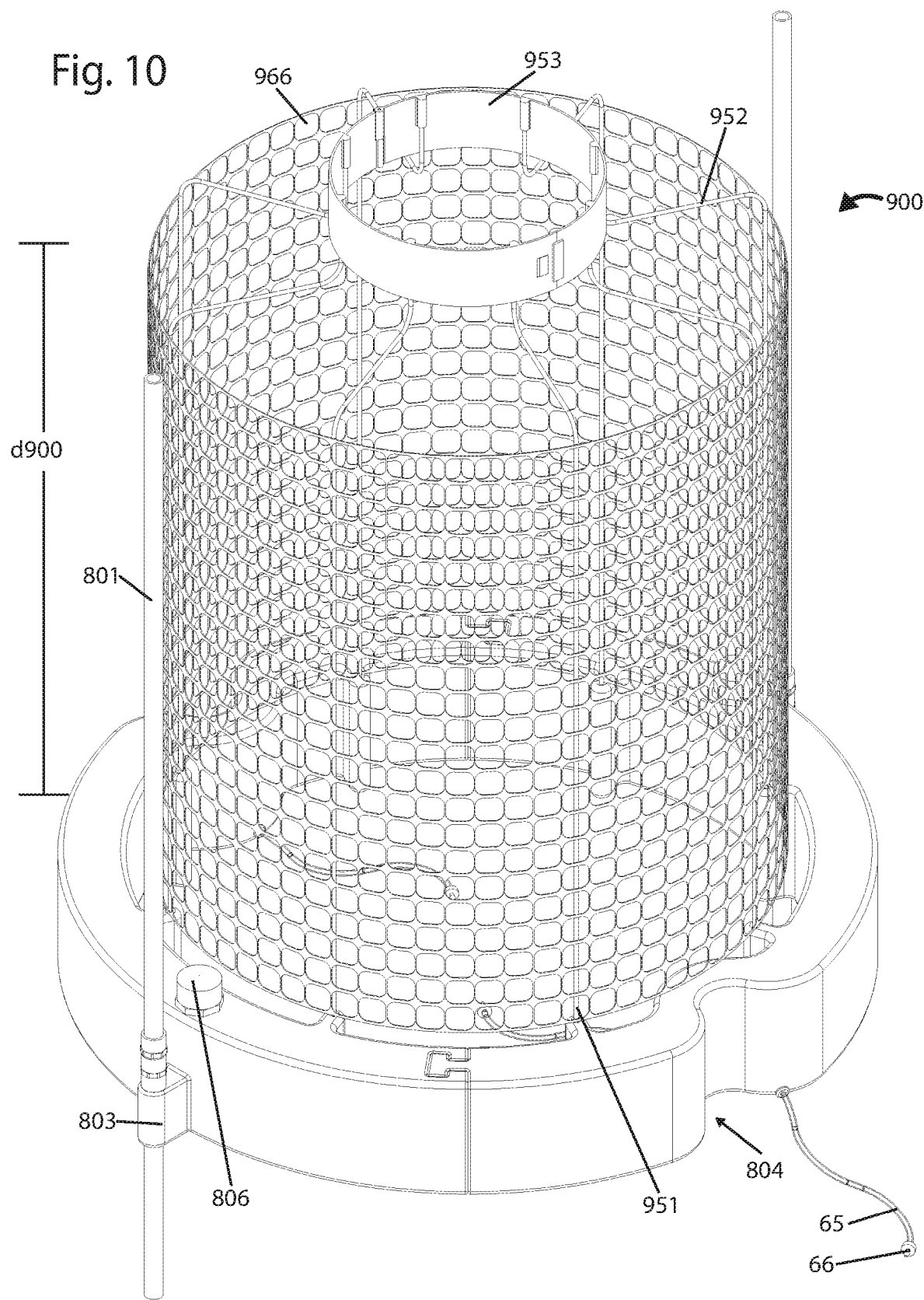
FIG. 10 is the same view as FIG. 9 with a plastic fence added.

Referring next to FIGS. 9,10 a wire shell above ground reservoir 900 comprises a left reservoir 901 connected to a right reservoir 902 by a tongue 904 in groove 903 design. Many equivalent joinder designs are available including a simple plate screwed across the tops of the reservoirs 901, 902. Height d90 may range from about three inches to about one foot. Interior and exterior soak hoses 65 are available. Guides 950 support wires 951. Wires 951 can bend at 952 to connect to collar 953. The wires 951 and posts 801 support a variety of accessories as shown in FIGS. 1, 3, 4. FIG. 10 shows a tall plastic fence 966 used to repel pests. Height d900 can range from about six inches to about three feet.

Figure 11:
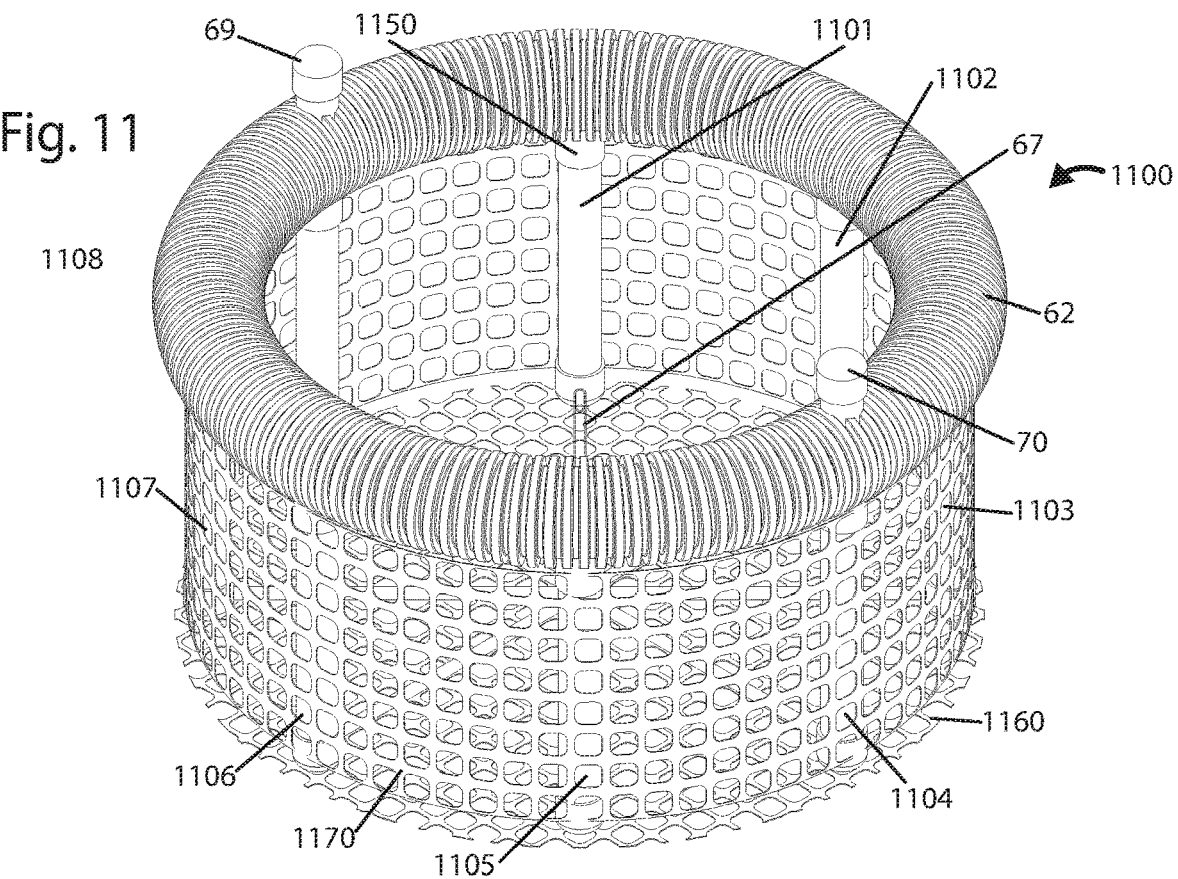
FIG. 11 is a top perspective view of a simplified embodiment of the FIG. 5 embodiment.
Figure 12:
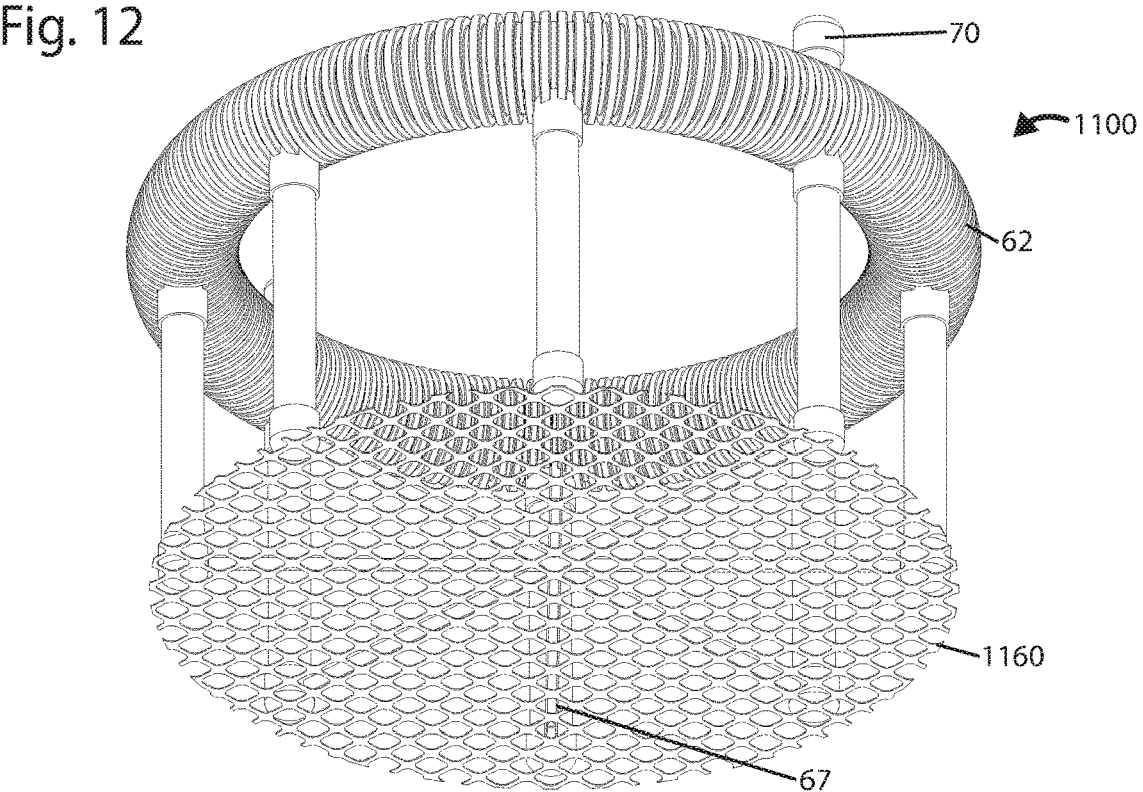
FIG. 12 is a bottom perspective view of the FIG. 11 embodiment.

Referring next to FIGS. 11,12 an underground reservoir 1100 has a top comprising a hose 62. Above ground inlets 69,70 allow for filling the hose 62 and nominally eight vertical non-curved columns 1101-1108, the eight vertical non-curved columns 1101-1108 do not have apertures installed, with about seven to about nine gallons of water and nutrients). Each vertical non-curved column has a bottom plug 1150 with a soaker hose 67 connector. Each soaker hose 67 connects to an opposing vertical non-curved column (soaker hose 1101 is connected to soaker hose 1105, 1102 to 1106, 1103 to 1107, 1104 to 1108). An alternate embodiment has a drain means comprising a hole or slot facing inward or at the bottom of the vertical column. A soaker hose type filler in the vertical column provides a slow drainage of water through the hole or slot equivalent to a soaker hose.

In operation a hole for a new plant is dug. Next a rodent protection screen 1160 is placed on the bottom of the hole. Next the side wall (plastic) screen 1170 is secured around the vertical columns 1101-1108. Next the assembly of the hose 62, vertical columns 1101-1108 and screen 1170 is placed on top of screen 1160. Then the dirt and fertilizer is applied to fill the hole around the new plant that rests on top of screen 1160. Finally inlets 69,70 are used to fill the reservoir 1100.

This embodiment provides equivalent post-planting watering as the embodiment 50 shown in FIG. 5, but offers a simpler and less expensive system.

Referring next to FIGS. 13,14 an underground reservoir 1300 is suited to bury next to an established plant. One or more reservoirs can be dug in around a mature tree for example. A top reservoir 1301 has an inlet 69. A neck 1304 joins the top reservoir 1301 to a bottom reservoir 1309. The bottom 1306 of the bottom reservoir 1309 is a plug as shown, but is identical to the neck 1304 so as to allow a plurality of reservoirs (1301,1309,13xx) to be joined.

Soaker hoses 1302,1303 allow water from reservoir 1301 to moisten the soil. Soaker hoses 1305,1310 allow water from reservoir 1309 to moisten the soil. Each reservoir can be sized as chosen, perhaps from about one gallon to about five gallon capacity.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. An underground drip reservoir comprising:
   a circular frame designed to be installed at or below ground level in a hole;
   said circular frame comprising a plurality of vertical, not curved, pipes fastened under a circular top hose;
   said vertical, not curved, pipe not having apertures;
   said a circular top hose having a hollow interior to serve as a first reservoir and having an above ground filler port when said circular frame is installed in the hole;
   said circular top hose having a fluid communication with each of said vertical pipes;
   each of said vertical pipes further comprising a soaker hose facing inwardly toward a central hollow of the frame;
   said soaker hose from each vertical pipe connects to an opposing vertical pipe;
   said plurality of vertical pipes further comprising a segment of the circular frame serving as a support for the circular top hose;
   said circular frame further comprising an open circular sidewall and an open bottom to enable a root system of a tree planted in the hollow interior of the circular top in the hole to grow through the circular sidewall and the bottom; and
   wherein said soaker hoses permit an outflow of water.

2. The underground drip reservoir of claim 1 further comprising a pest control barrier wrapped around an outside periphery of the plurality of vertical pipes.

3. The underground drip reservoir of claim 2, wherein the pest control barrier further comprises a plastic screen.

4. The underground drip reservoir of claim 1, wherein each vertical post has a height of about eighteen inches, and a diameter of the circular top ranges from about 2.5 to 3.5 feet.

5. The underground drip reservoir of claim 4, wherein each soaker hose has a diameter ranging from about ⅜ inch to about ⅝ inch.

6. The underground drip reservoir of claim 5 further comprising a total fluid holding capacity of the circular top and the vertical posts and the soaker hoses ranging from about five gallons to about ten gallons.

7. The underground drip reservoir of claim 1 further comprising a rodent protection screen under the vertical posts.

8. The underground drip reservoir of claim 1, wherein the plurality of vertical pipes further comprises at least six vertical pipes.

9. An underground drip reservoir comprising:
   a circular frame designed to be installed at or below ground level in a hole;
   said circular frame comprising a plurality of vertical, not curved, pipes fastened under a circular top hose;
   said circular top hose having a hollow interior to serve as a first reservoir and having an above ground filler port;
   said circular top hose having a fluid communication with each of said vertical pipes;
   each of said vertical pipes further comprising a drain means functioning to drain water toward a central hollow inside the circular frame;
   wherein the drain means further comprises a hole at a lower end of the vertical pipe, wherein a soaker hose element fills the hole so as to permit the drainage of water through the hole;
   said plurality of vertical pipes further comprising a segment of the circular frame serving as a support for the circular top hose;
   said circular frame further comprising an open circular sidewall and an open bottom to enable a root system of a tree planted in the hollow interior of the circular top in the hole to grow through the circular sidewall and the bottom; and
   wherein said soaker hose elements permit an outflow of water.

10. The underground drip reservoir of claim 9, wherein the plurality of vertical pipes further comprises at least six vertical pipes.

* * * * *